(12) United States Patent
Pimentel et al.

(10) Patent No.: US 8,316,925 B2
(45) Date of Patent: Nov. 27, 2012

(54) HEAT EXCHANGER ARRANGEMENT

(75) Inventors: Eduardo Alberto Nunes Mendes Pimentel, Samora Correia (PT); Helder José Trindade Cavaca, Samora Correia (PT)

(73) Assignee: João de Deus & Filhos, S.A., Arados, Samora Correia (PT)

( * ) Notice: Subject to any disclaimer, the term of this patent is extended or adjusted under 35 U.S.C. 154(b) by 149 days.

(21) Appl. No.: 12/165,326

(22) Filed: Jun. 30, 2008

(65) Prior Publication Data

US 2009/0014153 A1   Jan. 15, 2009

(30) Foreign Application Priority Data

Jul. 11, 2007 (EP) .................................... 07398010

(51) Int. Cl.
*F28D 1/04* (2006.01)
(52) U.S. Cl. ...................................... 165/152; 165/176
(58) Field of Classification Search .................. 165/152, 165/153, 176
See application file for complete search history.

(56) References Cited

U.S. PATENT DOCUMENTS

| | | | | |
|---|---|---|---|---|
| 4,303,052 A * | 12/1981 | Manfredo et al. | ............. | 123/563 |
| 4,436,145 A * | 3/1984 | Manfredo et al. | ............. | 165/67 |
| 4,474,162 A * | 10/1984 | Mason | ............. | 123/563 |
| 4,926,934 A * | 5/1990 | Ivy | ............. | 165/173 |
| 5,107,926 A * | 4/1992 | Calleson | ............. | 165/173 |
| 5,238,059 A * | 8/1993 | Smith | ............. | 165/173 |
| 5,311,935 A * | 5/1994 | Yamamoto et al. | ............. | 165/152 |
| 6,082,446 A * | 7/2000 | Ahaus et al. | ............. | 165/173 |
| 6,196,305 B1 * | 3/2001 | Geiger | ............. | 165/149 |
| 2006/0185833 A1 * | 8/2006 | Brost et al. | ............. | 165/149 |
| 2007/0175617 A1 * | 8/2007 | Brost et al. | ............. | 165/149 |
| 2007/0193731 A1 * | 8/2007 | Lamich et al. | ............. | 165/149 |
| 2008/0223562 A1 * | 9/2008 | Braic et al. | ............. | 165/158 |
| 2008/0245514 A1 * | 10/2008 | Hendrix et al. | ............. | 165/152 |

FOREIGN PATENT DOCUMENTS

| | | |
|---|---|---|
| DE | 19853455 | 6/1999 |
| EP | 1336736 | 8/2003 |
| FR | 2855602 | 12/2004 |
| FR | 2855605 | 12/2004 |
| JP | 10-159571 | 6/1998 |
| WO | 2006/125919 | 11/2006 |

OTHER PUBLICATIONS

European Search Report dated Dec. 28, 2007, European Patent Application No. 07 398 010.4.

* cited by examiner

*Primary Examiner* — Teresa Walberg
(74) *Attorney, Agent, or Firm* — Patterson & Sheridan, L.L.P.

(57) ABSTRACT

A heat exchanger arrangement comprising a charge cooler and a housing. The charge cooler comprises a charge cooler core, a header plate, a coolant entry duct and a coolant exit duct. Specifically, the charge cooler core comprises hallow heat-transfer elements through which a coolant can flow. The housing is in the form of a chamber with a single aperture for receiving the cooler core and comprises an air entry duct, an air exit duct and a flange. The cooler core is fixed inside the housing by fixing the header plate of the charge cooler to the flange of the housing. Additionally, the header plate of the charge cooler closes the single aperture for receiving the cooler core.

16 Claims, 8 Drawing Sheets

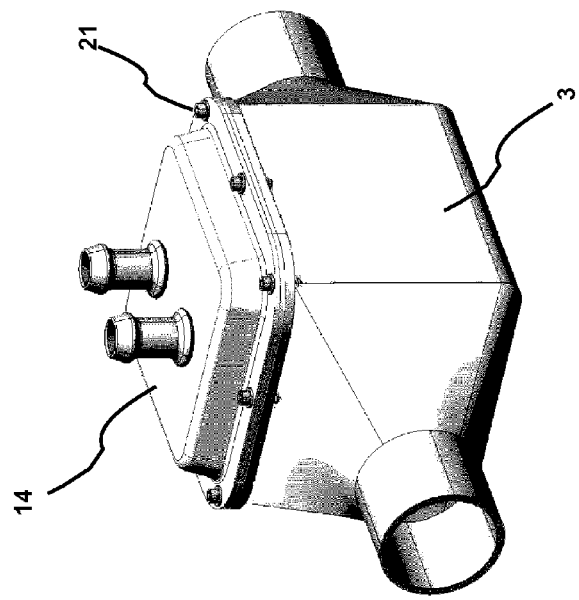
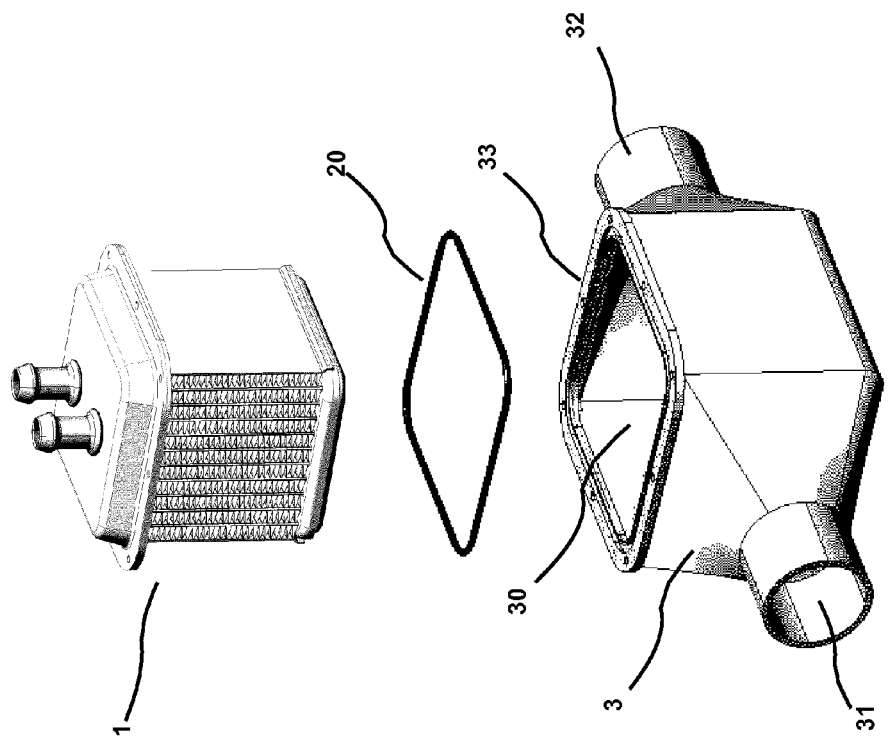
Fig. 2A
Fig. 2B

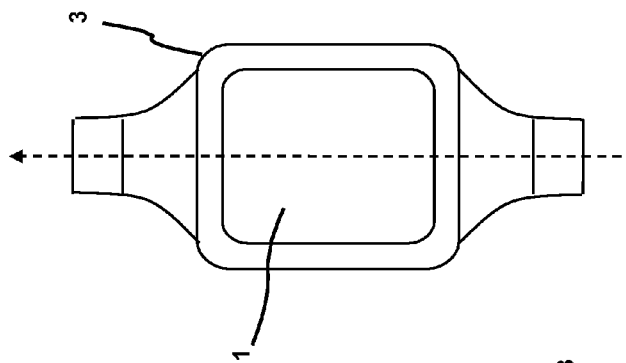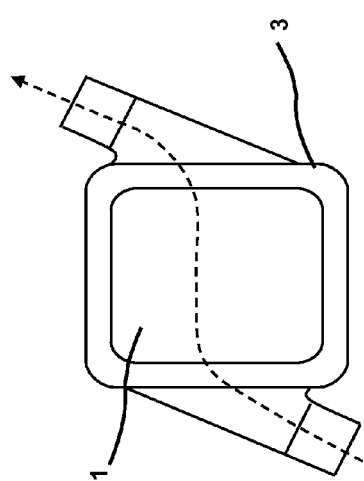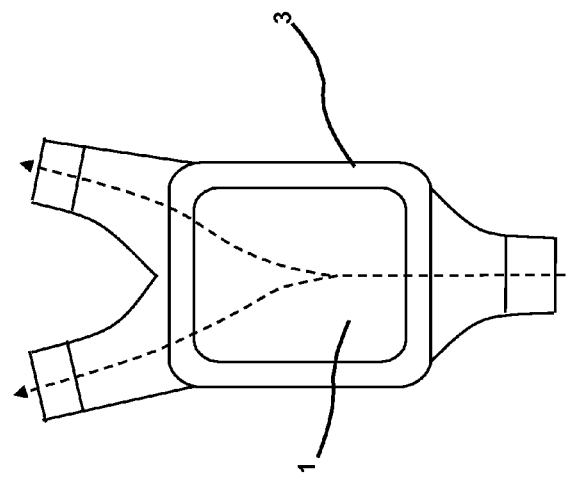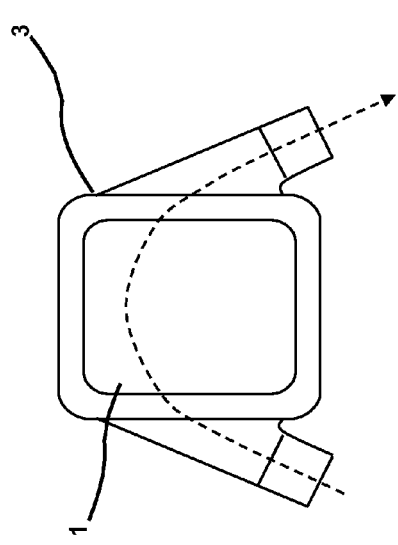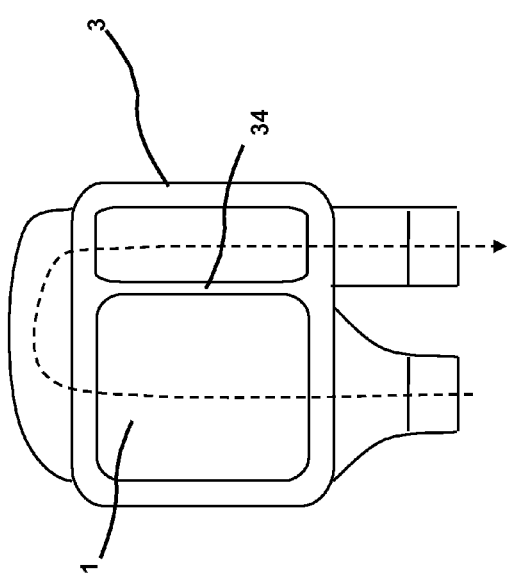

HEAT EXCHANGER ARRANGEMENT

CROSS-REFERENCE TO RELATED APPLICATIONS

This application claims benefit of European patent application number 07398010.4, filed Jul. 11, 2007, which is herein incorporated by reference.

BACKGROUND OF THE INVENTION

1. Field of the Invention

The invention relates to heat exchanges such as intercoolers or charge air/coolant coolers. More specifically the invention relates to an arrangement of a charge cooler allowing for a simplified assembly of the charge cooler core in its housing.

2. Description of the Related Art

Heat exchangers, such as charge air cooler are well known in the art. For example, in modern diesel engines a turbocharger compresses the output air of the engine in order to provide an increased mass flow of air to the engine, which allows for increasing the combustion of fuel and consequently performance. However, such compression of air also increases the air temperature. This might increase the total engine heat load or decrease the possible motor performance. Consequently, heat exchangers are used for cooling the charge air.

Typically such charge air coolers for automotive vehicles comprise a heat exchanger core mounted in the flow path of the charge air, which is supplied to a combustion engine. For this purpose, charge coolers typically include a plurality of elements including a charge cooler core and housing elements for defining the heat transfer path.

Increasing engine performance and engine downsizing require a more thorough pressure and temperature control. Also, new standards (such as the EURO 5 standard) require stricter control of the combustion air pressure and temperature in order to reduce emission. Additionally, protection regulations and increasing number of components in the front body section reduce the available space for such cooler arrangements. All these objectives should be reached, while maintaining the heat exchanger arrangement as small and as simple as possible in order to reduce production and maintenance costs.

As well known in the art, modern charge air coolers use liquids, such as water, as coolant in order to improve the heat exchange between the charge air and the coolant, while maintaining the dimension of the charge cooler small.

In this context, document U.S. Pat. No. 4,436,145 discloses a charge air cooler for mounting within the intake manifold of a combustion engine. The charge air cooler comprises a heat exchanger core formed by a plurality of relatively lightweight heat transfer elements defining a first flow path for charge air prior to ingestion of the charge air by the engine and a second flow path for a coolant in heat transfer relation with the charge air. The heat exchanger core supports at least one transversely extending rigid mounting sleeve for receiving a mounting bolt passed through a bolt-receiving hole in the intake manifold to secure the charge air cooler within the intake manifold.

JP 10159571 discloses an arrangement of a charge cooler which avoids mounting separate air ducts for air entrance/exit. Specifically, a first element provides the entrance duct and the exit duct, which are separated by wall portions. A charge cooler, in which cooling water circulates, is mounted on top of the entrance/exit duct. A further element is mounted on the opposite side of the charge cooler in order to close the air path.

SUMMARY OF THE INVENTION

The object of the invention is thus to provide a fully satisfactory response to those needs.

According to the present invention, this object is achieved by means of a heat exchanger arrangement having the features set forth in the claims that follow.

The claims are an integral part of the disclosure of the invention provided herein.

According to the invention, the arrangement comprises a heat exchanger, such as a charge cooler, and a concave housing in the form a chamber, wherein the housing has an aperture for mounting the heat exchanger in the interior of the housing. Those skilled in the art will appreciate that such housing can be produced e.g. by plastic injection or die casting. In the following, reference will be made primarily to a charge cooler, however the invention might be applied to any air/coolant heat exchanger.

Specifically, the charge cooler comprises a charge cooler core having a plurality of relatively lightweight heat transfer elements defining a first flow path for passage of charge air and a second flow path for passage of a coolant in close heat exchange relation with the charge air.

More specifically, the charge cooler comprises on one side an entry and an exit duct for the coolant and the hosing comprises an entry and an exit duct for the charge air.

Preferably the width of the chamber in the housing has the same width as the charge cooler core, which guarantees that charge air will pass through the charge cooler core when the charge cooler is mounted in the housing. Those skilled in the art will appreciate that production tolerances do not represent any major problem, because it is not required that the charge cooler core fits perfectly into the chamber. Conversely, the arrangement has to guarantee only that the major part of the charge air will flow through the cooler core and consequently the charge cooler core might have any three-dimensional shape, however, a cube like shape is preferable.

A preferred arrangement of the invention relates to a charge air/coolant cooler for motor vehicles, comprising a brazed aluminium core. Specifically in one embodiment the core consists of a plurality of tubes in which the coolant is circulating. Additionally, the charge cooler might comprise an upper tank with the entry and the exit duct and a lower tank, which closes the coolant circulation path.

Alternatively, the cooler core might comprise a plurality of hollow plates, each having an entry and an exit duct. Preferably, these hollow plates are mounted in the form of a stack.

In a further improved embodiment the tubes or plates have arranged thereto a plurality of fins in order to increase the surface in contact with the charge air, increasing thereby the heat exchange.

Preferably, the housing comprises a flange for assembling the charge cooler at the housing. For example, the charge cooler might be fixed at the housing with bolts or screws. Alternatively the charge cooler might be soldered to the housing. In a further embodiment, the charge cooler comprises bended walls and is crimp to the housing.

Those skilled in the art will appreciate that a large variety of other charge cooler cores and mounting methods for fixing the charge cooler at the housing might be used without departing from the scope of the invention.

BRIEF DESCRIPTION OF THE DRAWINGS

The invention will now be described, by way of example only, with reference to the enclosed figures of drawing, wherein:

FIGS. 2A and 2B are three-dimensional views of a heat-exchanger arrangement, wherein the charge cooler is fixed with screws or bolts at the housing, FIGS. 8A to 8E show possible embodiments of the housing.

DETAILED DESCRIPTION

Throughout the description and the drawings, reference numbers will be maintained for same or functionally similar elements.

Figure 1B:
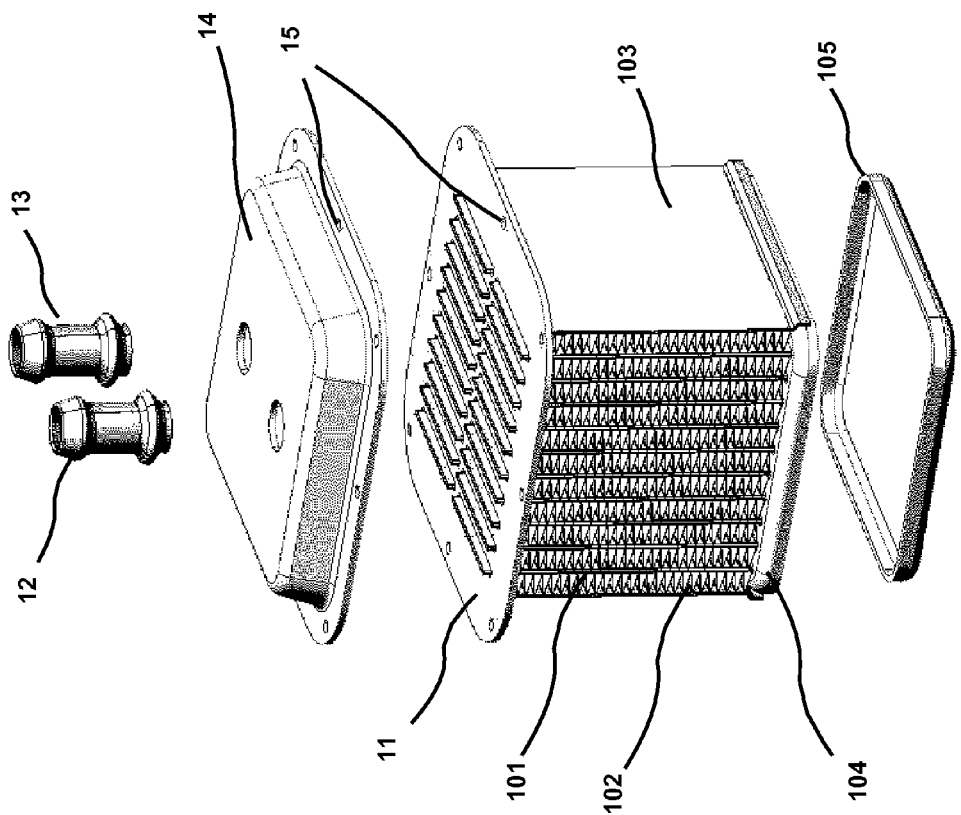
FIGS. 1A and 1B are three-dimensional views of a first embodiment of a charge cooler in accordance with the invention, wherein the core comprises a plurality of tubes and wherein an upper tank is provided comprising holes for fixing the charge cooler to a housing.
Figure 1A:
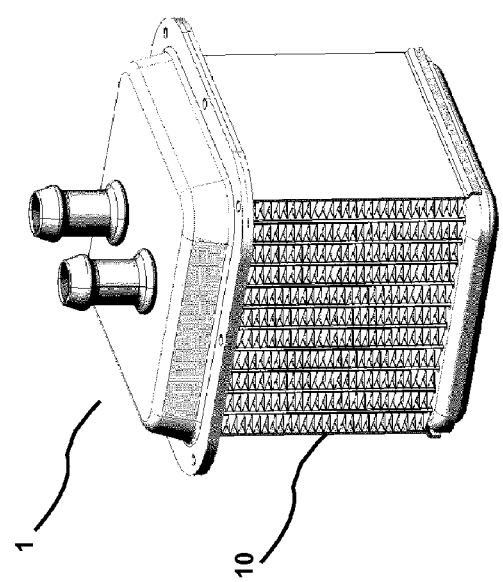

FIGS. 1A and 1B show a charge cooler 1 of a heat exchanger arrangement consisting of a brazed aluminum cooler core 10 and a header plate 11.

Specifically, the cooler core 10 comprises a plurality of tubes 101 and fins 102.

Preferably, the cooler core 10 comprises also two side plates 103, a bottom plate 104 and a lower tank 105.

In a preferred embodiment, the cooler core 10 is manufactured by assembling the various parts and then brazing the cooler core assembly.

By attaching an upper tank 14 to the header plate 11 of the charge cooler 1 a hermetically sealed circulation system for a coolant is created. Specifically, the upper tank comprises an entry duct 12 and an exit duct 13 for connecting external tubes.

Preferably, the upper tank 14 is assembled to the core 10 before brazing.

In the exemplary embodiment, the upper tank 14 and the header plate 11 comprise holes 15 for fixing the core 1 with bolts or screws to a cooler housing as will be described in the following. Specifically, the holes 15 in the upper tank 14 and the header plate 11 are arranged on top of each other.

FIGS. 2A and 2B show a heat-exchanger arrangement, wherein the charge cooler 1 is fixed with screws or bolts 21 to a housing 3.

Specifically, the housing 3 is in the form of a chamber and comprises on one side a single aperture 30 for receiving the cooler core 10.

Preferably, the housing 3 comprises an entry duct 31 and an exit duct 32 for inserting the heat exchanger assembly in a charge air flow, and a flange 33 to which the charge cooler 1 can be fixed.

As explained in the foregoing, the holes in the upper tank 14 and the header plate 11 are arranged on top of each other and consequently the bolts or screws 21 will fix both the upper tank 14 and the header plate 11 to the flange 33.

In a preferred embodiment the brazed cooler core 10 will be inserted into the chamber in the housing 3 and the header plate 11 having brazed thereto the upper tank 14 will be positioned on top of the flange 33 of the housing 3, thereby closing the aperture 30 in the housing 3.

Preferably, a gasket 20 might be provided between the header plate 11 of the charge cooler 1 and the flange 33 of the housing 3 in order to render the arrangement hermetically sealed. Those skilled in the art will appreciate that further isolations might be provided in order to render the heat exchanger arrangement or the charge cooler hermetically sealed.

Preferably, in a lateral direction the charge cooler core 10 has a shape matching the chamber in the housing 3, so that the majority of charge air flow will pass through the charge cooler core 10.

Preferably, the charge cooler core 10 has six almost rectangle sides or a "cube like" shape and the aperture 30 in the housing 3 is slightly larger than the top or bottom side (whatever is larger) of the cooler core 10.

Figure 3:
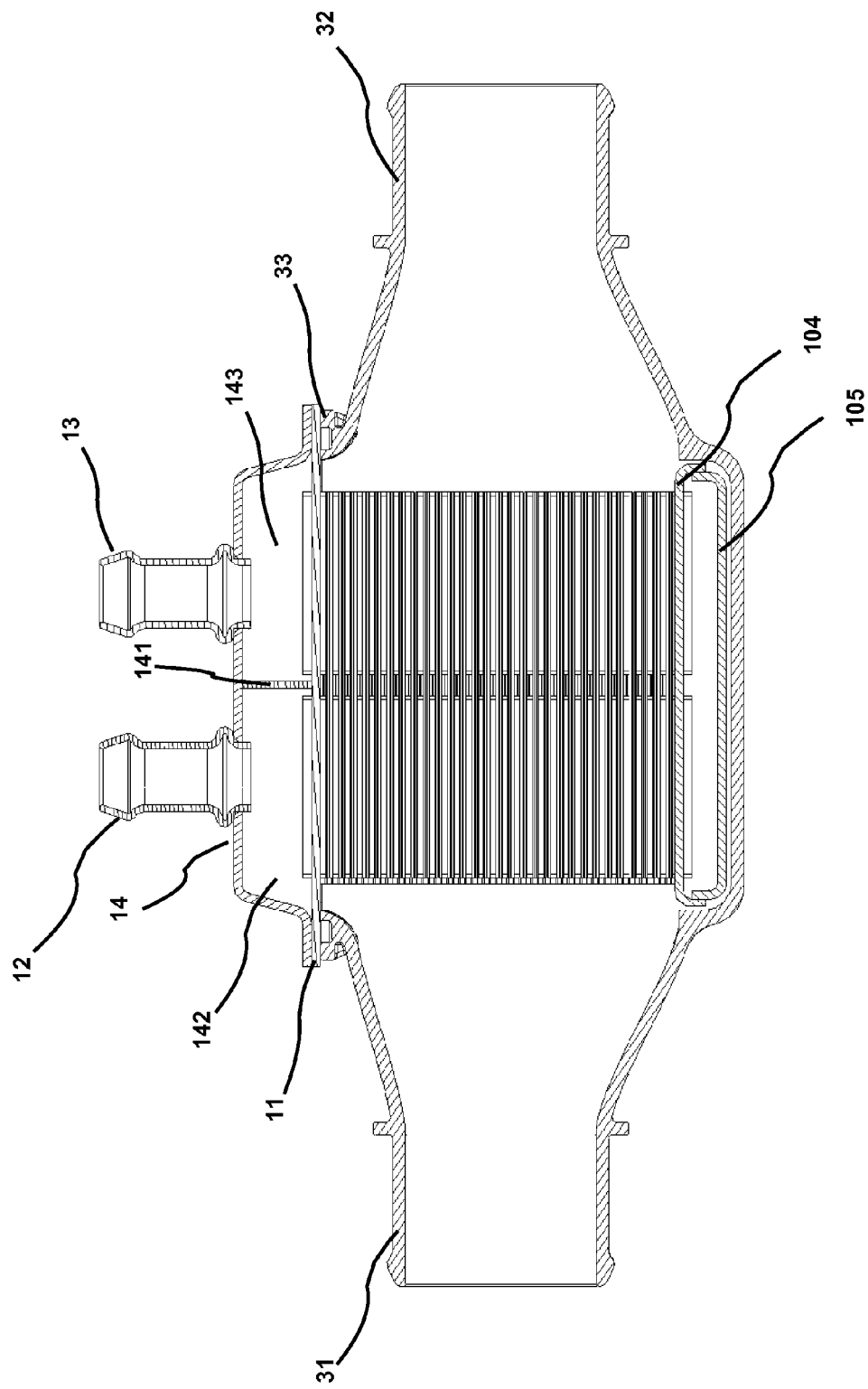
FIG. 3 shows a side view of the cooler core mounted in the housing.

FIG. 3 shows in detail a heat exchanger arrangement, wherein the charge cooler 1 is mounted in the interior of the housing 3.

Specifically, the upper tank 14 might have a wall portion 141, which separate the upper tank 14 into two smaller tanks 142 and 143, respectively. More specifically the coolant entry duct 12 should be fixed to the first tank 142 and the exit duct 13 should be fixed to the second tank 143. Accordingly, the coolant will flow from the entry duct 12 through the first upper tank 142 and the first portion of the tubes 101 into the lower tank 105 from which the coolant will continue to flow through the second portion of the tubes 101 and the second upper tank 143 to the exit duct 13.

Likewise, the charge air will flow from the entry duct 31 in the housing 3 through the cooler core 10 to the exit duct 32.

In the preferred embodiment, both the bottom plate 104 and the lower tank 105 have a cup shaped form. In this way, the lower tank 105 might be fixed to the cooler core 10 by inserting the lower tank 105 in the bottom plate 104 before brazing the complete cooler core assembly.

Figure 4B:
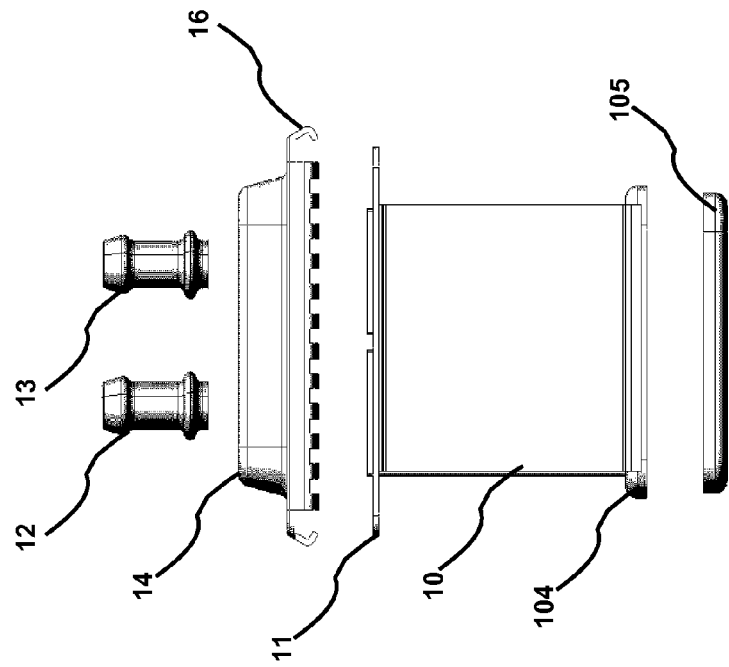
FIGS. 4A and 4B show an alternative embodiment of a charge cooler in accordance with the invention, wherein the core comprises an upper tank with bend walls for fixing the charge cooler to the housing.
Figure 4A:
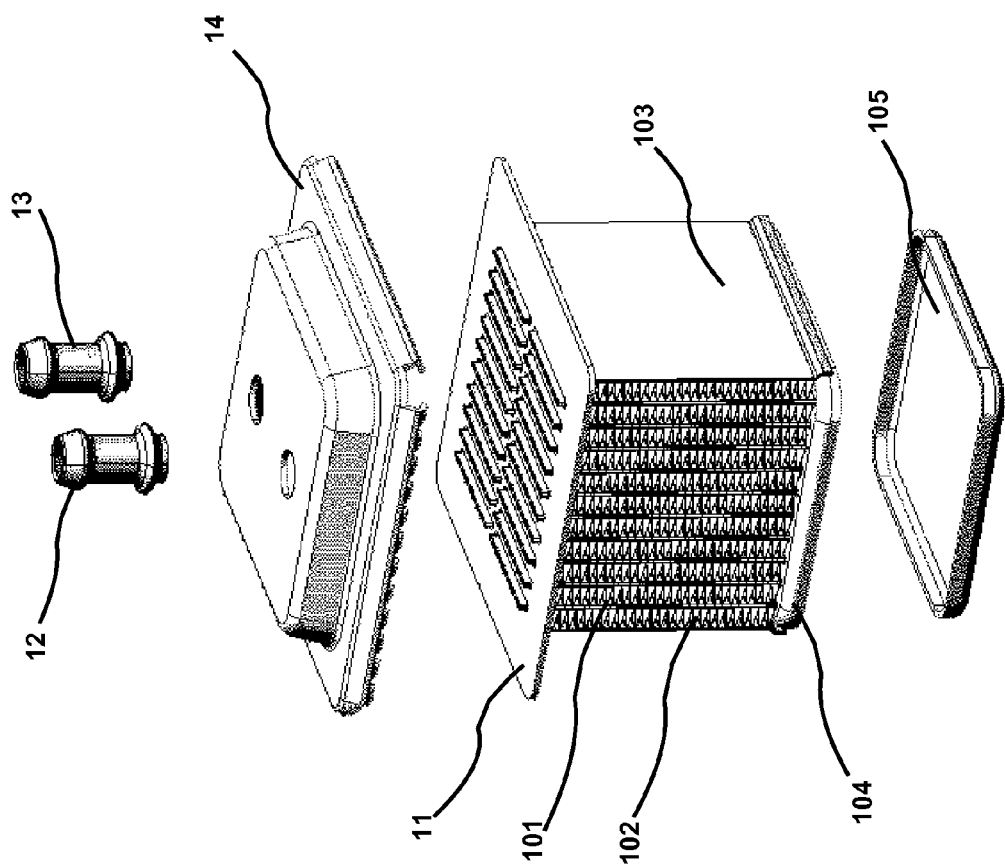

FIGS. 4A and 4B show an alternative charge cooler 1, wherein the upper tank 14 comprises bend walls 16.

Figure 5B:
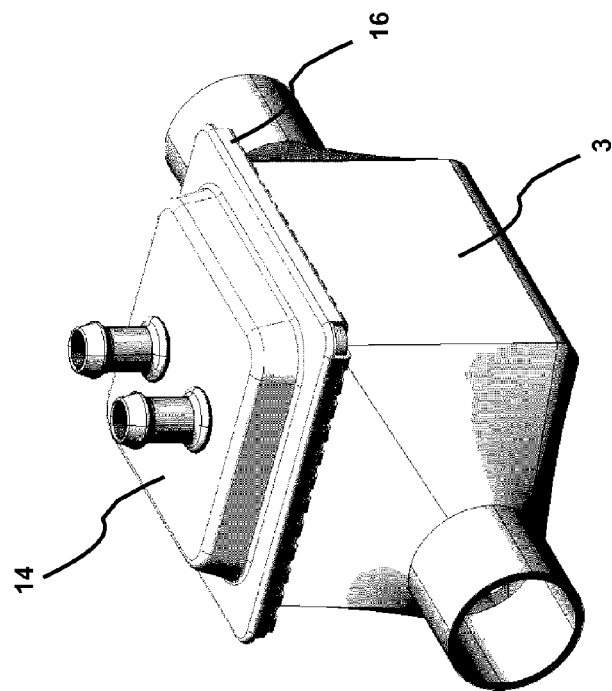
FIGS. 5A and 5B are three-dimensional views of an alternative heat-exchanger arrangement, wherein the core is fixed by crimping to the housing.
Figure 5A:
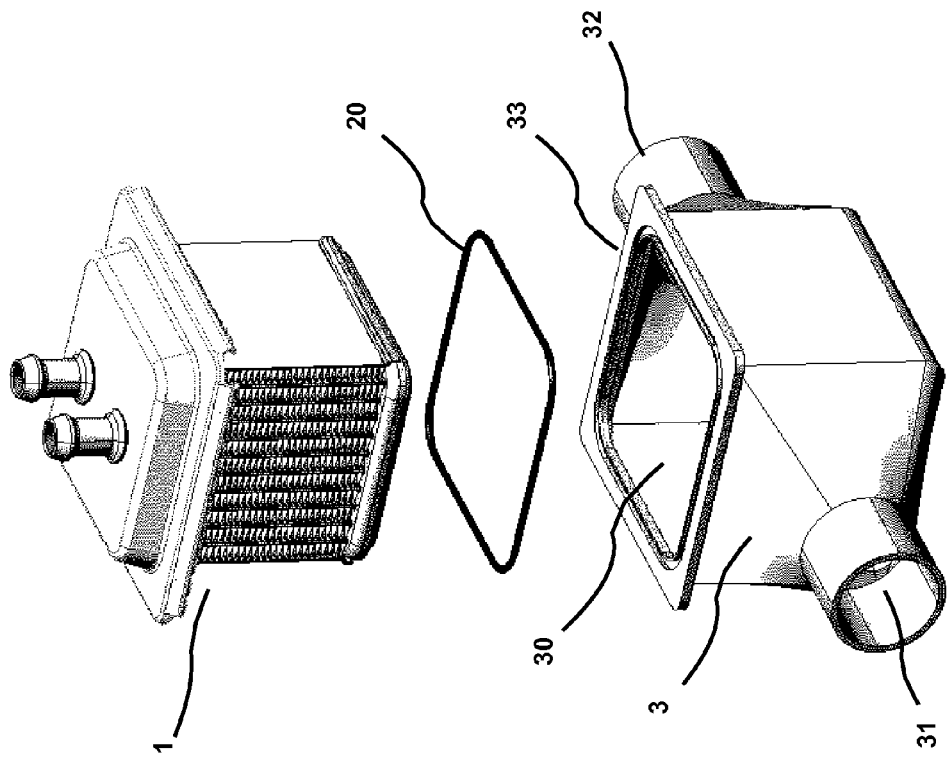

Specifically, FIGS. 5A and 5B show how the charge cooler 1 is crimped to the flange 33 of the housing 3.

Figure 6:
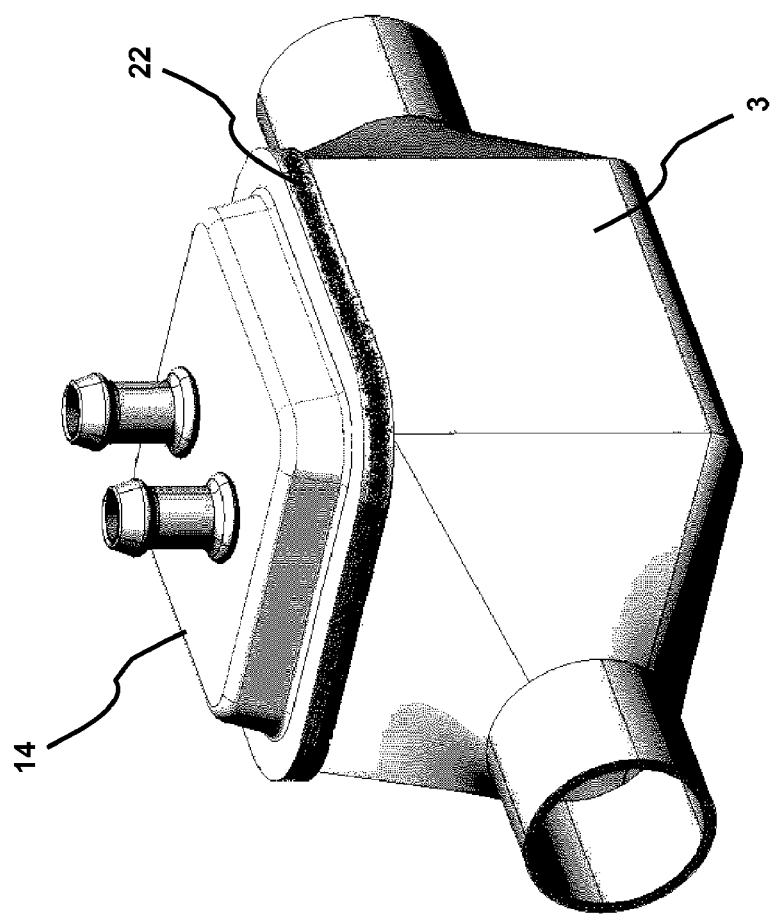
FIG. 6 is a three-dimensional view of an alternative heat-exchanger arrangement, wherein the charge cooler is soldered to the housing.

FIG. 6 shows a further alternative embodiment of a heat exchanger arrangement, wherein the header plate 11 of the charge cooler 1 is soldered (22) to the flange 33 of the housing 3.

Figure 7B:
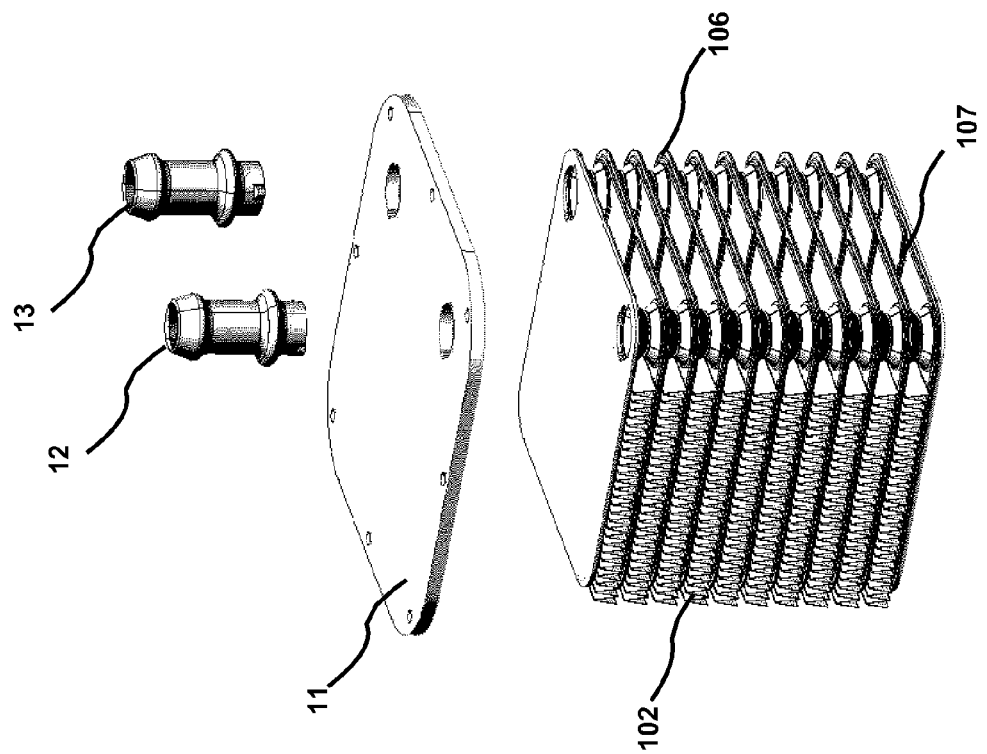
FIGS. 7A and 7B are three-dimensional views of an alternative embodiment of a charge cooler in accordance with the invention, wherein the core comprises a plurality of hollow plates mounted in the form of a stack.
Figure 7A:
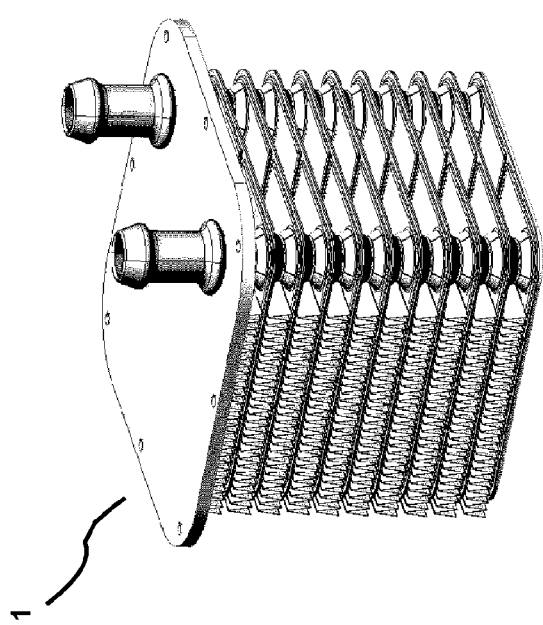

FIGS. 7A and 7B show an alternative charge cooler 1. Specifically, the cooler core 10 comprises a stack of hollow plates 106. Specifically, each of the hollow plates 106 has an entry duct, an exit duct and might have wall portions 107 separating the plate at least partially in two smaller portions in which the coolant can circulate.

Preferably, the plates are mounted in form of a stack, wherein all entry ducts and exit ducts of the various plates 106 are sequentially connected to each other.

Those skilled in the art will appreciate that the previously disclosed mounting methods might be applied also to the alternative charge cooler 1. In particular, the header plate 11 might be provided with the bend walls 16 for crimping the charge cooler to the flange 33 of the housing 3. Alternatively, the header plate 11 might be fixed to the flange 33 by soldering or by means of screws or bolts.

The geometry of the charge air entry duct 31 and the exit duct 32 of the housing 3 might be arranged in various ways in order to change the air flow circulation. Some of the possible arrangements are shown in FIGS. 8A to 8E.

Specifically, FIGS. 8A to 8C show possible embodiments of the housing 3, wherein an entry duct 31 and an exit duct 32 are arranged on two opposed sides of the housing 3.

FIG. 8D shows an embodiment of the housing 3, wherein the entry duct 31 and the exit duct 32 are arranged on the same side of the housing 3. In this case, additional wall portions 34 might be provided in the housing 3, which separate the housing 3 into two portions. Accordingly, hot charge air arriving from the entry duct 31 will pass the first portion of the housing 3 having mounted therein the charge cooler 1. Subsequently, the charge air will pass through the second portion of the housing 3 to the exit duct 32.

FIG. 8E shows a further embodiment of the housing 3, showing that also a plurality of entry ducts 31 and exit ducts 32 might be used in accordance with the invention. In particular the housing 3 might comprise an entry duct 31 and two exit ducts 32.

The examples should not be considered as limitation of the invention. Conversely, any embodiment of the housing 3 might be used. In particular any number of entry ducts 31 or exit ducts 32 might be used.

While the foregoing is directed to embodiments of the present invention, other and further embodiments of the invention may be devised without departing from the basic scope thereof, and the scope thereof is determined by the claims that follow.

The invention claimed is:

1. A heat exchanger arrangement, comprising:
 a charge cooler, comprising:
  a brazed cooler core comprising:
   an upper, horizontal header plate, and
   a lower, horizontal header plate, and
   first and second pluralities of vertical, parallel-connected heat-transfer tubes connected therebetween and through which a coolant flows vertically in use,
  at least one coolant entry duct and at least one coolant exit duct, and
  an upper, horizontal tank connected to the cooler core by brazing and comprising wall portions, said wall portions separating the upper tank into a first, horizontal tank and a second, horizontal tank,
  wherein:
   said coolant entry duct extends vertically from said first tank, and
   said coolant exit duct extends vertically from said second tank; and
 a housing in the form of a chamber with a single aperture for receiving said cooler core and comprising:
  at least one air entry duct and at least one air exit duct, and
  a flange arranged in the vicinity of said aperture,
  wherein:
   said cooler core is fixed inside said housing by fixing said upper header plate to said flange, and
   said upper header plate closes said single aperture.

2. The arrangement of claim 1, wherein said charge cooler core in a lateral direction essentially matches said chamber in said housing, so that the majority of charge air flow will pass through said charge cooler core.

3. The arrangement of claim 1, wherein the charge cooler core has a rectangle bottom side and wherein said single aperture for receiving said cooler core has a slightly larger dimension than said bottom side of said charge cooler core.

4. The arrangement of claim 1, wherein said upper header plate is fixed to said flange of said housing with bolts or screws, or by soldering.

5. The arrangement of claim 1, wherein said charge cooler comprises bended walls and wherein said cooler core is crimped to the flange of said housing.

6. The arrangement of claim 1, wherein said upper header plate and said upper tank have holes arranged on top of each other and wherein said charge cooler is fixed with bolts or screws at said flange of said housing.

7. The arrangement of claim 1, wherein said upper header plate and said upper tank are soldered to said flange of said housing.

8. The arrangement of claim 1, wherein said upper tank comprises bended walls and wherein said charge cooler is crimped to the flange of said housing.

9. The arrangement of claim 1, wherein said charge cooler core comprises a lower tank.

10. The arrangement of claim 9, wherein said lower header plate and said lower tank have a cup shaped form.

11. The arrangement of claim 1, wherein said cooler core comprises two side plates.

12. The arrangement of claim 1, wherein said tubes have arranged thereto a plurality of fins in order to increase the surface, which is in contact with the charge air, for increasing thereby the heat exchange.

13. The arrangement of claim 1, wherein a gasket is provided between said upper header plate of said charge cooler and said flange of said housing.

14. The arrangement of claim 1, wherein said at least one air entry duct and said at least one air exit duct are arranged on the same side of said housing, and wherein said housing comprises wall portions, which separate the housing into at least two portions.

15. The arrangement of claim 1, wherein said cooler core is made of aluminum.

16. The arrangement of claim 1, wherein said cooler core is manufactured by assembling the cooler core parts and brazing the assembled cooler core.

* * * * *